United States Patent [19]
Bennin

[11] Patent Number: 5,933,293
[45] Date of Patent: Aug. 3, 1999

[54] HEAD SUSPENSION LOAD BEAM HAVING A LOW PROFILE INTEGRATED FLEXURE

[75] Inventor: Jeffry S. Bennin, Hutchinson, Minn.

[73] Assignee: Hutchinson Technology, Inc., Hutchinson, Minn.

[21] Appl. No.: 08/882,609

[22] Filed: Jun. 25, 1997

[51] Int. Cl.⁶ .................................................. G11B 5/60
[52] U.S. Cl. ............................................................ 360/104
[58] Field of Search ............................................. 360/104

[56] References Cited

U.S. PATENT DOCUMENTS

| | | | |
|---|---|---|---|
| 5,491,597 | 2/1996 | Bennin et al. | 360/104 |
| 5,519,552 | 5/1996 | Kohira et al. | 360/104 |
| 5,557,488 | 9/1996 | Hamilton | 360/104 |
| 5,598,307 | 1/1997 | Bennin | 360/104 |
| 5,808,834 | 9/1998 | Jurgenson | 360/104 |

*Primary Examiner*—Robert S. Tupper
*Attorney, Agent, or Firm*—Faegre & Benson, LLP.

[57] ABSTRACT

A head suspension for use in a dynamic storage device includes a load beam combined with an electrical interconnect assembly, wherein a slider bond pad is supported within an aperture of the load beam by conductive integrated leads that form at least a part of a gimbal ring, and an anchor plate is connected to only a part of the leads within the gimbal ring. Preferably plural anchor plates are provided at spaced locations around a complete gimbal ring, and the lead portions spanning between the anchor plates provide clearance to facilitate portions of the head slider during pitch and roll movements.

20 Claims, 5 Drawing Sheets

HEAD SUSPENSION LOAD BEAM HAVING A LOW PROFILE INTEGRATED FLEXURE

TECHNICAL FIELD

The present invention is directed to a head suspension for supporting a head slider relative to a rigid disk drive, the head suspension of the type having an integrated flexure or gimbal and including integral conductors. More particularly, the integrated flexure utilizes the conductors for pitch and roll support in a manner to provide a lower side profile.

BACKGROUND OF THE INVENTION

Within the data storage industry, data storage devices typically include a head for reading and/or writing data onto a storage medium. Storage device examples include magnetic and optical devices. The storage medium may be in the form of a disk which may be flexible or rigid depending on the disk drive. An actuator mechanism is used for positioning the read/write head at specific locations or tracks in accordance with the disk drive usage. Linear and rotary actuators are known based on the manner of movement of the head. Head suspensions are provided between the actuator and the head and support a slider in proper orientation relative to the disk surface.

In a rigid disk drive incorporating one or more disks, head suspensions are provided for supporting a head slider to "fly" over the surface of the rigid disk when it is spinning. Specifically, the head is usually located on an aerodynamically designed slider which flies on an air bearing generated by the spinning disk. In order to establish the fly height, the head suspension is also provided with a spring force that counteracts the aerodynamic lift force generated by the air bearing.

A suspension assembly of the type used in a rigid disk drive comprises the head slider and the head suspension, the head suspension comprising a load beam and a flexure. Load beams normally have an actuator mounting region, a rigid region and a spring region between the actuator mounting region and the rigid region for providing the aforementioned spring force. A bend in the form of a radius within the spring region can be used to provide the spring force. The flexure is provided at the distal end of the load beam from the actuator mounting region and provides a slider mounting pad to which the head slider is mounted and which is designed to permit pitch and roll movements of the head slider to follow disk surface fluctuations. Many types of flexures have been developed including flexures that are integrated into the design of the load beam and those formed as a separate element and fixed to the rigid region of the load beam.

In order to permit pitch and roll movements of the head slider, flexures typically include a cantilever portion having a free end which is resiliently movable relative to the remainder of the flexure. Depending on the design, more than one movable end may be provided. In the case of integrated flexures or gimbals, a slider bond pad is usually supported by one or more sets of bridges that define pitch and roll axes and which extend from the rigid region of the load beam. The bridges are designed to be sufficiently resilient so that they can flex to permit the pitch and roll movements of the head slider during usage.

Developments are being made for increasing the storage capacity of hard drives and in the reduction of the size of the hard drives to facilitate smaller and more powerful computers. In a rigid disk drive, the rigid disks are typically provided in a stack on a spindle. Likewise, the head sliders are supported by a stack of head suspensions, each of which is connected with the actuator assembly for moving the stack of head suspension and head slider assemblies over the respective surfaces of the rigid disks. The actuator may be linear or rotary as defined by the movement of the head sliders. By decreasing the spacing between the disks within such a stack, greater storage capacities can be achieved. Moreover, even with smaller disks and smaller size restrictions, with increased storage densities of the disks, much greater capacities can be achieved in even smaller spaces. Greater storage density of the disks require that the head sliders fly closer to the disk surface during use.

The spacing of the rigid disks, however, and more importantly the space between the disks, is limited by the ability to insert and position the suspension assembly or assemblies within the space. Thus, to enable closer disk spacings, it may be desirable to reduce the thickness of the suspension assemblies including the thickness of the head suspension and the thickness of the head slider. It is important, however, when attempting to reduce thickness to maintain performance characteristics of the head suspension. Simply making the head suspensions, for example, from a thinner material can have a deleterious effect on performance. Head suspensions are designed to have stiffness characteristics in its bending modes, torsional modes, and lateral bending modes. Performance must be particularly controlled at the resonance frequencies of the specific modes. Thus, to use thinner materials, other design features may need to be incorporated such as using higher side rails or other stiffening features to enhance stiffness to control any of the various modes.

Another component in the construction of its suspensions is the interconnect assembly for relaying signals to and from the head along the head suspension assembly. At the actuator mounting end of the head suspension, the interconnect assembly connects with the amplifying and control electronic circuits of a disk drive. Traditional interconnect assemblies include multiple conductors, usually two or four, comprising copper wires encapsulated in plastic sheathing.

Interconnect assembly conductors can have a large effect on the head suspension assembly performance. Conductor stiffness alone can dramatically affect the rigidity of the spring regions and flight performance. The connection of the conductors to the head slider can place unwanted torques or biases on the head slider. Moreover, the positioning and connecting of wires is a labor intensive endeavor. Electrical flex circuits have also been developed, but basically have the same drawbacks. Additionally, the interconnect assembly itself adds to the thickness or side profile of the head suspension which must be taken into account for disk spacing.

A more recent development is the introduction of head suspensions having leads or conductors integrated or patterned directly onto the surface of the load beam and/or flexure. Examples include the head suspension and interconnect assemblies described in U.S. Pat. Nos. 5,391,842 and 5,491,597 and U.S. patent application Ser. Nos. 08/249,117 and 08/478,396, each of which is owned by the assignee of the subject application. The basic concept is that the integrated lead is patterned onto the load beam with a layer of dielectric material for insulation between the conductive material and the load beam. The main advantage is that the conductors can be precisely located and may be made in a process integral with the load beam. Thus, the characteristics of the load beam including its interconnect assembly are much more highly predictable. Of the above examples, U.S. patent application Ser. Nos. 08/249,117 and 08/478,396 also disclose the use of the conductive material of the integrated leads as an integral part of the flexure or gimbal assembly. That is, the conductive material provides a mechanical interconnect, such as between the load beam and a slider bond pad, as well as the electrical interconnect to the head slider.

Another advantage of integrated lead conductors is that they can be made relatively thin on the load beam surface so as to require minimum spacing between disks of a disk drive. However, even with such an interconnect assembly having a conductor acting as both the mechanical and electrical connection to the slider bond pad, it is necessary that the flexure or gimbal provide the necessary clearances to allow adequate pitch and roll movement of the head slider when mounted to the slider bond pad. Typically, this means forming offsets within either a portion of the flexure construction, possibly within the conductive material, so as to offset the head slider sufficiently from the load beam to permit adequate pitch and roll.

SUMMARY OF THE INVENTION

The present invention is directed to a head suspension having integrated leads as conductors wherein the construction facilitates adequate pitch and roll clearances within the flexure or gimbal without the need for forming offsets within the flexure. By the present invention, a lower side profile construction of an integrated lead head suspension can be made. Accordingly, less spacing between rigid disks is needed, thereby permitting closer disk spacing and increased storage capacity for hard disk drives.

These advantages can be achieved by a head suspension for use in a dynamic storage device comprising a load beam combined with an electrical interconnect assembly, wherein a slider bond pad is supported within an aperture of the load beam by conductive integrated leads that form at least a part of a gimbal ring, and an anchor plate is connected to only a part of the leads within the gimbal ring. Preferably plural anchor plates are provided at spaced locations around a complete gimbal ring, and the lead portions spanning between the anchor plates provide clearance to facilitate portions of the head slider during pitch and roll movements.

More specifically, the load beam includes an actuator mounting region, rigid region, a spring region and a flexure region toward a distal tip of the load beam, the flexure region including an aperture provided through the load beam and a slider bond pad positioned within the aperture, and an electrical interconnect assembly comprising a plurality of conductive integrated leads patterned onto and connected with a surface of the load beam, the integrated leads including lead portions provided on the flexure region of the load beam and extending into the aperture and connected with the slider bond pad for supporting the slider bond pad within the aperture and for defining at least a first axis of motion for the slider bond pad, wherein at least two lead portions form a part of a gimbal ring within the aperture but between the slider bond pad and the load beam, and an anchor plate connects the at least two lead portions within the gimbal ring along only a part of each lead portion that forms the part of the gimbal ring.

Preferably, a second axis of movement of the slider bond pad is also provided by the lead portions and the anchor plates connect the lead portions together at the points where the first and second axes of motion for the slider bond pad cross the gimbal ring. The head suspension preferably further includes insulating material between the lead portions and the slider bond pad, the anchor plates, and the load beam so that the lead portions provided on the load beam in the flexure region and lead portions connected with the slider bond pad and the anchor plate are substantially in the same plane.

The present invention is also directed to the combination of the head suspension with a head slider connected to the slider bond pad. Preferably, the lead portions form a gimbal ring that extends substantially completely about the slider bond pad, and the lead portions provide plural bridges between the load beam and the gimbal ring extending along the first and second axes of motion of the slider bond pad, and plural anchor plates provide connection between lead portions at plural points where the first and second axes of motion of the slider bond pad cross the gimbal ring. Thus, the head slider can be sized such that a portion thereof can extend under a portion of the gimbal ring that spans between anchor plates.

More particularly, a generally rectilinear surface of the head slider that is connected with the slider bond pad can have its four corners extend under different portions of the gimbal ring that span between anchor plates.

DETAILED DESCRIPTION OF THE PREFERRED EMBODIMENTS

Figure 1:
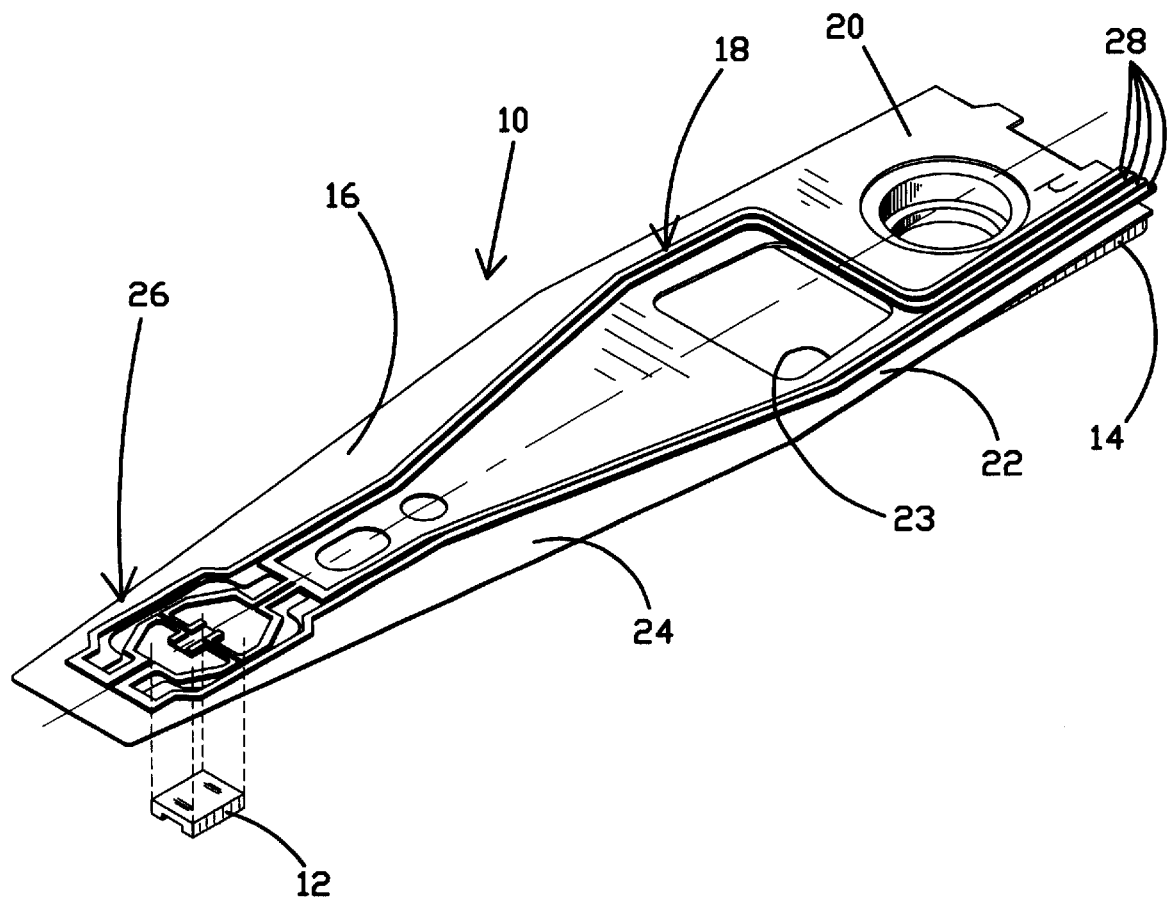
FIG. 1 is an isometric view of a head suspension having four integrated lead conductors and an integrated flexure, wherein portions of the integrated leads provide the mechanical function for supporting a slider bond pad.
Figure 2:
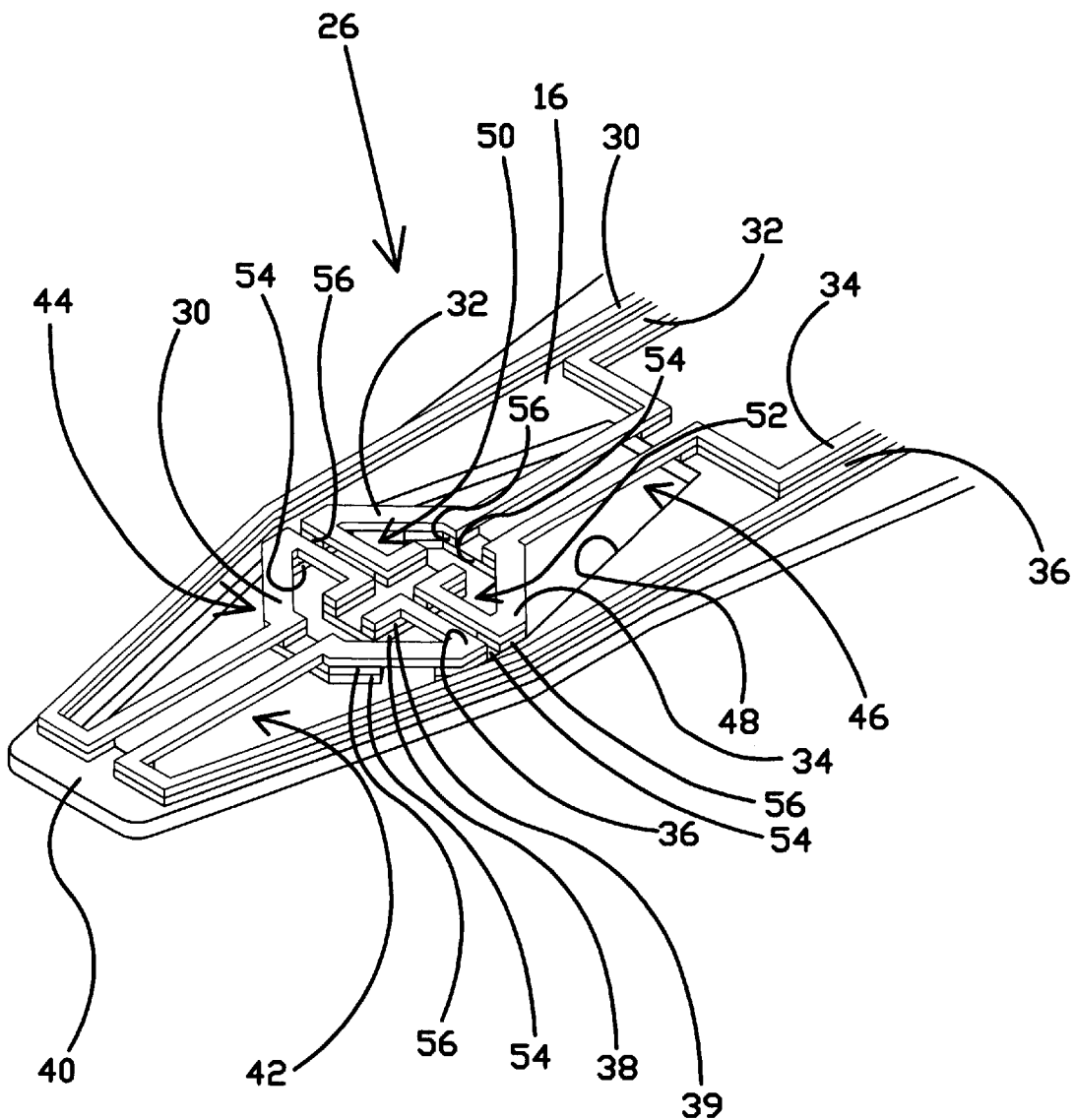
FIG. 2 is an enlarged view of the integrated flexure region of the head suspension of FIG. 1.
Figure 3:
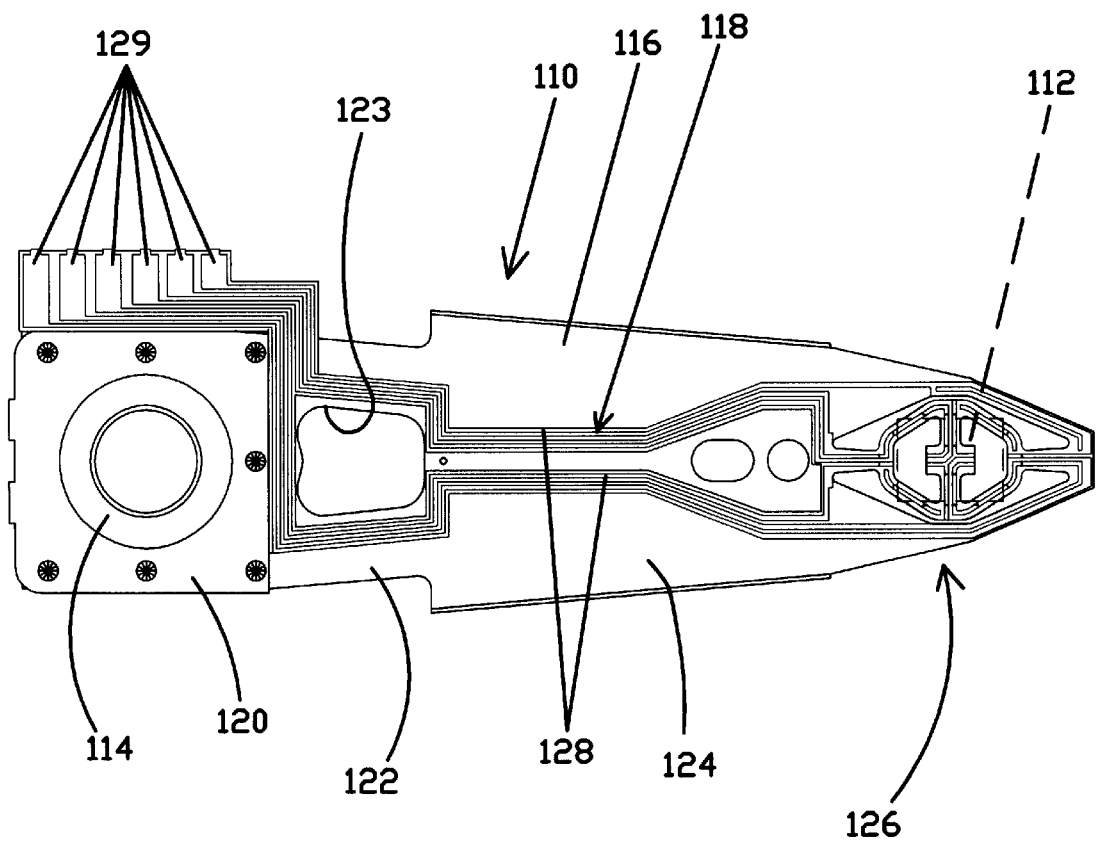
FIG. 3 is a top plan view of a six conductor integrated lead and integrated flexure head suspension, wherein portions of the integrated leads provide the mechanical support function for a slider bond pad.

With the reference to the attached figures wherein like components are designated with like numerals throughout the several figures, and initially to FIGS. 1 and 2, a head suspension 10 is illustrated combined with a head slider 12 and base plate 14. Head slider 12 conventionally would include a read/write head (not shown) for data storage and retrieval to the surface of a rotating magnetic storage disk (not shown) within a rigid disk drive (not shown). The head suspension 10 is to be connected with an actuator (not shown) via the base plate 14 for locating the head slider 12 over the surface of a storage disk. In a rigid disk drive, the head slider 12 is aerodynamically designed so that an air bearing generated by the surface of the rotating disk causes the head slider 12 to fly over the surface of the disk. The present invention is particularly directed to head suspensions of the type used in rigid disk drives; however, it is contemplated that the advantages of the present invention are applicable to other dynamic drives, magnetic, optical, or the like, as well as to contact drives where the head slider contacts disk surface during operation.

Head suspension 10 comprises a load beam 16 and an electrical interconnect assembly 18. Load beam 16 itself is comprised of an actuator mounting region 20, a spring region 22, a rigid region 24, and a flexure region 26 at the distal end of load beam 16. Actuator mounting region 20 is conventionally connected with the base plate 14, such as by welding, to provide the means by which the head suspension 10 is connectable in a conventional manner to an actuator assembly (not shown). The spring region 22 is provided between the actuator mounting region 20 and the rigid region 24 for providing a predetermined spring force and thus a specific load to the distal tip of the load beam 16 and thus to the head slider 12. This spring force is utilized to offset the lift force that is generated by the action of an air bearing of a spinning disk surface on the head slider 12 and to define the offset height and the fly height of the head slider 12 above the disk surface during use. The spring region 22 typically includes a bend or radius that generates the spring force. A cutout or window 23 may be provided, as illustrated, within the spring region 22 in a known manner for controlling, e.g. reducing, the spring force of the spring region 22 depending on the ultimate load to be provided at the head slider 12 for a given offset height. The rigid region 24 provides a link for transferring the spring force from the spring region 22 to the flexure region 26 and can be modified in many ways to increase stiffness properties. Typically, rails (not shown) are provided along the side edges to add stiffness.

The electrical interconnect assembly 18 can comprise any number of conductive integrated leads 28, with four shown in FIGS. 1 and 2. The integrated leads 28 can be provided in any number of ways along a surface (or more than one surface) of the load beam 16. However, it is preferable that the layout of the integrated leads 28 be provided in a way taking into account certain electrical considerations, such as conductivity, resistivity and current carrying ability, and also not to be detrimental to desired mechanical properties, such as stiffnesses and mass balancing.

An insulating or dielectric layer is preferably provided between each of the conductive integrated leads 28 and the material of the load beam 16. This is particularly important when the load beam 16 is made of a conductive material itself, such as stainless steel, which is conventionally used. The dielectric or insulating layer need not be present everywhere in-between the conductive integrated leads 28 and the load beam 16, but should be provided sufficiently to ensure electrical isolation. The dielectric layer may comprise an insulating adhesive that is secondarily used for securing the integrated leads 28 to the surface of the load beam 16 or may comprise a layer of material, such as polyimide adhered between the integrated leads 28 and the load beam 16. The conductive integrated leads 28 themselves, may comprise any conductive material, but preferably comprise copper or a beryllium copper alloy for both electrical and mechanical properties.

A preferred manner of making the head suspension 10, including the load beam, the dielectric layer, and the integrated leads 28, comprises a photolithographic process for defining the various conductive and structural regions by etching a laminate sheet including at least material suitable for those three layers. Such method is disclosed in commonly owned U.S. patent application Ser. No. 08/249,117 filed May 25, 1994, the entire disclosure of which is incorporated herein by reference.

With reference now to FIG. 2, distal portions 30, 32, 34, and 36 of the integrated leads 28 are illustrated within the flexure region 26. Each of these lead portions function to provide the electrical interconnect with a slider bond pad 38 to which head slider 12 is to be attached. Moreover, each distal portion also includes a portion that provides a mechanical interconnect between the load beam 16 and the slider bond pad 38.

Lead portions 30 and 36 are shown to follow the outer edges of the load beam 16 up to a distal cross piece 40 of the load beam 16. From there they extend proximally to form a first longitudinal bridge 42 and then a half of a gimbal ring 44. The gimbal ring 44 is provided within an aperture 48 provided through the distal end of load beam 16. Lead portions 32 and 34 come together at about a longitudinal center line and extend distally within aperture 48 to define a second longitudinal bridge 46 that also form a second half of the gimbal ring 44. Lead portions 30 and 32 together define a first transverse bridge 50 and terminate on the top surface of the slider bond pad 38 to provide electrical access terminals for connection with the head slider 12. Likewise, lead portions 36 and 34 together define a second transverse bridge 52 and terminate on the top surface of the slider bond pad 38 to again provide head slider connect electrical terminals.

At four locations around the gimbal ring 44, specifically at the portions thereof adjacent each longitudinal and transverse bridge, an anchor plate 54 is provided. The anchor plates 54 are connected with the respective lead portions 30–36 by way of an intermediate layer of dielectric material 56. The dielectric material 56 preferably adheres the anchor plates 54 to the lead portions. Anchor plates 54 provide a connection between the adjacent lead portions so that the first and second longitudinal bridges 42 and 46 define a roll axis for the slider bond pad 38, while the first and second transverse bridges 50 and 52 define a pitch axis. The inherent flexibility of the lead portions 30, 32, 34, and 36 which make up the bridges 42, 46, 50, and 52 permit the pitch and roll movements of the slider bond pad 38 and head slider 12 during usage. The thickness and width of the lead portions can be modified in accordance with desired mechanical properties to adequately provide pitch and roll movements. The anchor plates 54 ensure that the bridges are structurally mechanically formed to function in this manner. The bridges themselves, however, preferably comprise only the portions of the conductive integrated leads.

Within the gimbal ring 44, between each of the anchor plates 54, a span section is provided comprised only of the conductive integrated lead material. Each of these spans provide space for accommodating the head slider 12 and for providing room for the head slider to pitch and roll even when head slider portions are covered by the span sections. This advantage will be more fully described below with regard to the second embodiment. However, it is noted that it is the thickness of the slider bond pad 38, the dielectric layer 39 and of an adhesive layer connecting the slider bond pad 38 to a head slider 12 which together provide the ability to facilitate pitch and roll movements within the structure of the gimbal ring 44 even without any offsets provided within the above-described bridges or the load beam 16.

A six conductor integrated lead head suspension 110 is illustrated in FIGS. 3–6. Head suspension 110 comprises a load beam 116 and an electrical interconnect assembly 118. The head suspension 110 is to be connected with a head slider 112 and is shown connected with a base plate 114.

Load beam 116 comprises an actuator mounting region 120 conventionally secured to the base plate 114, a spring region 122 including an opening or window 123 for controlling the spring force of the head suspension 110, a rigid region 124 and a flexure region 126.

Six conductive integrated leads 128 are provided extending from the actuator mounting region 120 toward the flexure region 126. Preferably the conductor layout includes leads that are positioned and spaced taking into account certain electrical consideration, such as conductivity, resistivity and current carrying ability, and are also optimized for stiffness properties and mass considerations in the design of the head suspension 110. The integrated leads 128 are illustrated with connector leads 129 at the actuator mounting region 120 for providing electrical connection with the circuitry of the disk drive (not shown).

Figure 4:
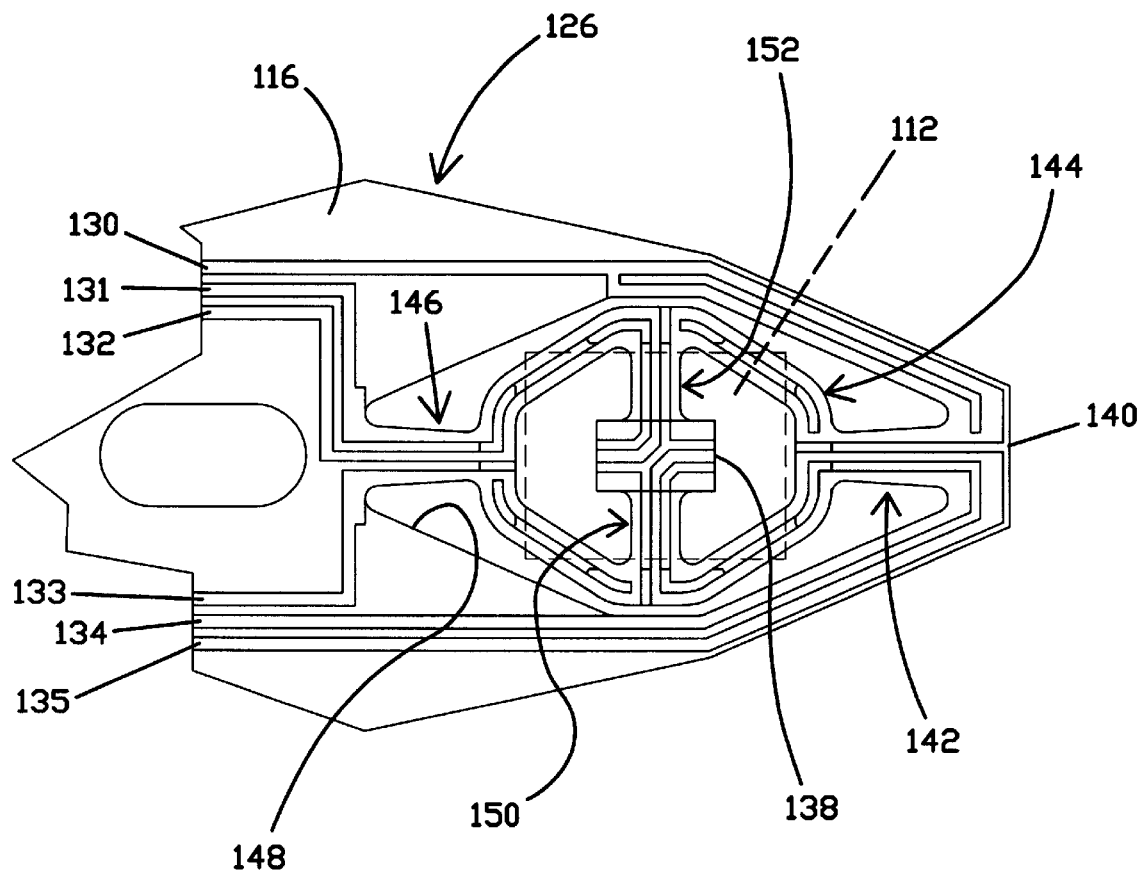
FIG. 4 is an enlarged view of the integrated flexure region of the head suspension of FIG. 3.

Distal portions 130, 131, 132, 133, 134, and 135 of the conductive integrated leads 128 are provided within the flexure region 126, as shown in FIG. 4. An aperture 148 is provided through the distal end of the load beam 116 within which a gimbal ring 144 is disposed. Within the gimbal ring 144, a slider bond pad 138 is further disposed.

As illustrated, lead portions 130, 134, and 135 are provided along the side edges of the tip of the load beam 116 to a distal cross piece 140 and extend proximally within the aperture 148 to define a first longitudinal bridge 142. Note that lead portion 130 is split along a portion of the load beam 116 leading to the cross piece 140 for balance with the two lead portions 134 and 135 on the other side. Lead portions 130 (again split into two), and lead portions 134 and 135 together define one-half of the gimbal ring 144 within the aperture 148.

Lead portions 131, 132, and 133 converge and then extend distally into the aperture 148 to define a second longitudinal bridge 146 and to also provide a second half of the gimbal ring 144. Lead 133 is shown split within the gimbal ring 144 for balance.

Lead portions 133, 134, and 135 extend from the gimbal ring 144 to support the slider bond pad 138 and define a first transverse bridge 150. Similarly, lead portions 130, 131, and 132 extend from the gimbal ring 144 to define the second transverse bridge 152 also supporting the slider bond pad 138. As in the first embodiment, the integrated leads 128 not only provide electrical terminals or pads on the slider bond pad for electrical interconnect with the head slider, but also provide the mechanical spring means for defining the flexible bridge structures for supporting the slider bond pad 138 and permitting pitch and roll movements of a head slider when attached thereto. The ends of the lead portions 130–135 provide the electrical interconnect terminals on the slider bond pad 138 for connecting with the head slider 112.

Figure 6:
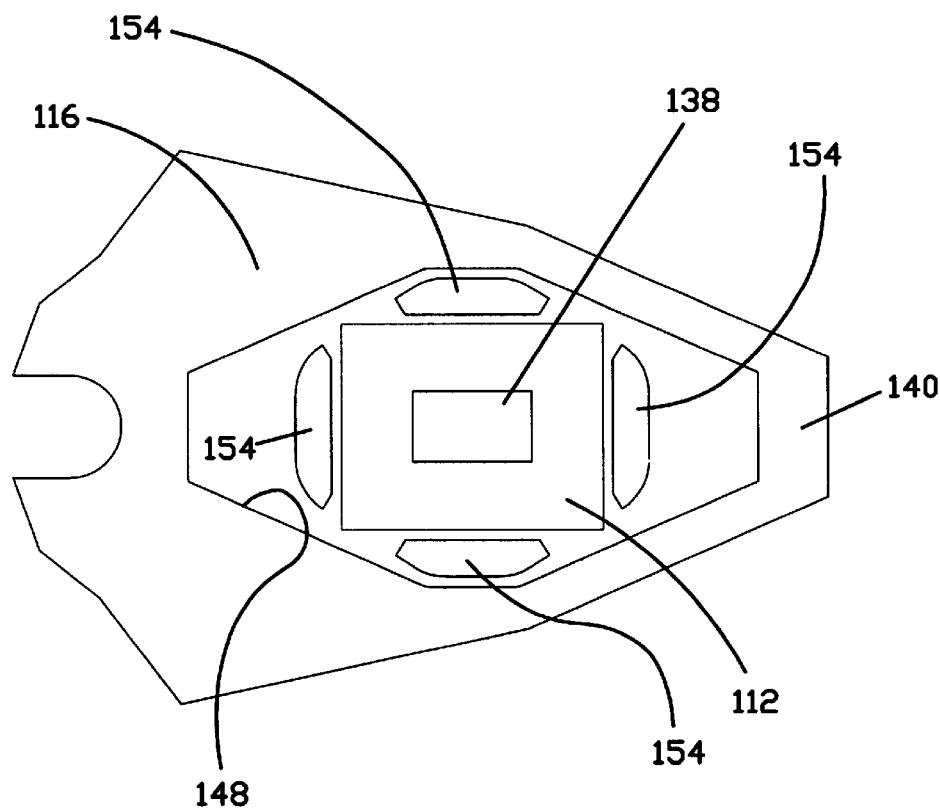
FIG. 6 is an enlarged view of the integrated flexure region of the head suspension of FIGS. 3 and 4 showing the load beam material, the slider bond pad, and plural anchor plates without the integrated lead conductors, and showing the relationship of a head slider positioned within the supporting structure.

Like the above described embodiment, the conductive integrated leads 128 are preferably electrically isolated from the material of the load beam 116 by dielectric material, particularly at points where they overlap. However, the bridges 142, 146, 150, and 152 preferably comprise only the conductive material of the integrated leads. Anchor plates 154, shown best in FIG. 6 are also preferably connected to the lead portions 130–135 within the gimbal ring 144 at the connection of the gimbal ring 144 to each of the bridges 142, 146, 150, and 152. The spans between the anchor plates 154 of the gimbal ring 144 also preferably only comprise the conductive material of the respective lead portions 130–135 to facilitate head slider pitch and roll.

Figure 5:
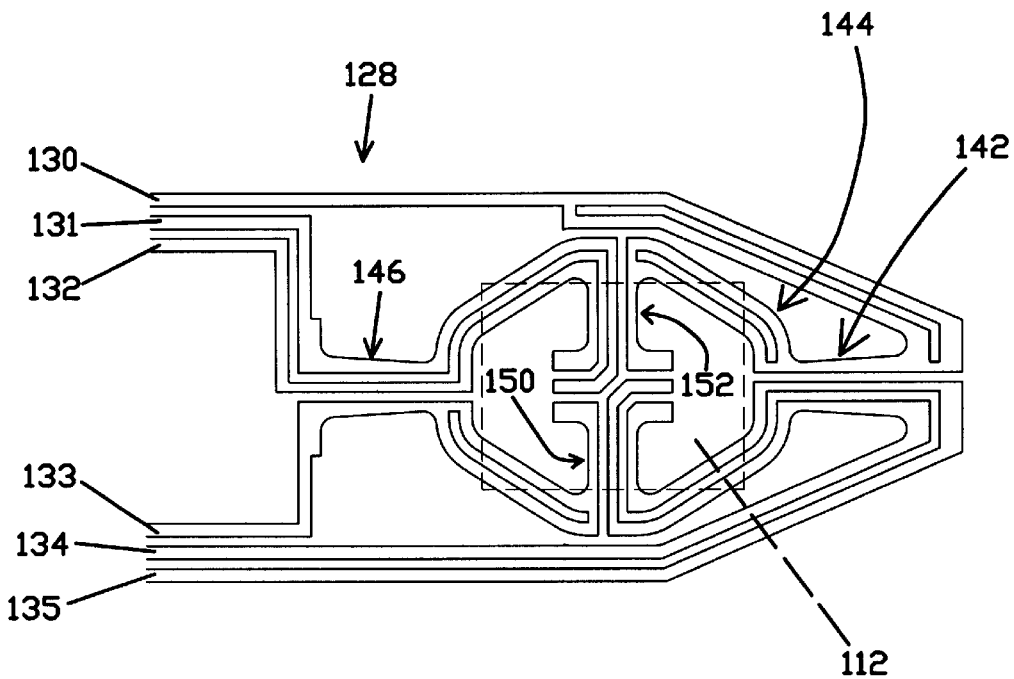
FIG. 5 is an enlarged view of the integrated lead conductors within the integrated flexure region of the head suspension of FIGS. 3 and 4.

The positioning of a head slider 112 as compared to the load beam 116, aperture 148, anchor plates 154, and the conductive integrated leads 128 is best illustrated in FIGS. 5 and 6. Specifically, head slider 112 is shown where it is to be connected with the slider bond pad 138 which is itself supported in place by the lead portions 130–135. The anchor plates 154 are positioned within the aperture 148 but outside the perimeter of the head slider 112. As shown in FIG. 5, the gimbal ring 144 is designed so that the corners of the head slider 112 can fit below the span sections of the gimbal ring 144; that is, the spans of the conductive material of the lead portions between the anchor plates 154.

In elevation, the slider bond pad 138 is spaced below a lower surface of the lead portions 130–135 by the thickness of the dielectric layer of the slider bond pad 138 and the thickness of the material of the slider bond pad 138. Preferably, the slider bond pad 138, the anchor plates 154, and the load beam 116 are formed from the same sheet of material, such as a layer of stainless, by an etching process. The anchor plates 154 are positioned to provide the requisite control of the respective bridges, but not to interfere with movement of the head slider 112. The thickness of the dielectric material and the slider bond pad 138 provide clearance between the top surface of the head slider 112 and the bottom of the lead portions making up the gimbal ring 144. Moreover, the thickness of an adhesive layer (not shown) used for mounting the head slider 112 to the slider bond pad 138 adds to the clearance between the head slider portions and the span sections of the gimbal ring 144 to further facilitate head slider pitch and roll.

Based on the clearance provided by the dielectric material layer, the slider bond pad 138 and the adhesive layer, additional structural modifications to provide such an offset are not needed. As shown no offsets are provided within the bridges or load beam structure. Offsets, however, may be additionally provided if desired for increased clearance.

Conventional wiring techniques can be used for connecting the terminal ends of the lead portions 130–135 to electrical bond pads (not shown) of the head slider 112. Conventional techniques include wire stitching, the provision of a tang extending from the slider bond pad to be connected to pads on the top surface of the head slider 112, reflow solder, and the like.

It is also contemplated that many other modifications can be made to the size and pattern of the integrated leads on the load beam and to the gimbal bond pad for electrical and mechanical support. The leads may be provided wider at the anchor plates for improving adhesion between them and the anchor plates by way of a dielectric adhesive or other material. Narrower lead widths may be utilized within the bridges to reduce stiffness and permit more flexibility in the pitch and roll movements.

As a further modification, the gimbal ring can be sized so that the leads thereof be further inboard of the head slider corners to permit material of the load beam defining aperture 148 to be moved in so as to provide a shock limiter for hitting the head slider corners under shock load. Such material of the load beam may be deformed out of the plane of the load beam 116 to provide the adequate clearance for pitch and roll movement and define the limit of movement for shock.

Alternatively, the gimbal ring may be routed just inside the head slider corners to maximize access to the slider bond pad. If a smaller head slider is used, the gimbal ring can be routed outside of the head slider to permit greater head slider pitch and roll movement, if necessary.

It is also contemplated that a less than full gimbal ring can be made. For example, a one half gimbal ring may be defined by two (or more) leads making a pair of transverse bridges and a single longitudinal bridge. Pitch and roll axes would still be defined. It is also possible that only one axis, either pitch or roll, may be required for a specific application. Similarly, the axes need not be longitudinally and transversely aligned and may be non-perpendicularly arranged.

I claim:

1. A head suspension for use in a dynamic storage device and for supporting a head slider, said head suspension comprising:

a load beam having an actuator mounting region, a more distal rigid region, a spring region between said actuator mounting region and said rigid region, and a flexure region toward a distal tip of said load beam, said flexure region including an aperture provided through said load beam and a slider bond pad positioned within said aperture;

an electrical interconnect assembly comprising a plurality of conductive integrated leads patterned onto and connected with a surface of said load beam, said integrated leads including lead portions provided on said flexure region of said load beam and extending into said aperture and connected with said slider bond pad for supporting said slider bond pad within said aperture and for defining at least a first axis of motion for said slider bond pad, wherein at least two lead portions form a gimbal ring portion that is provided, in a top view of the load beam, within said aperture but between said slider bond pad and said load beam, and an anchor plate connects the at least two lead portions within the gimbal ring portion along only a part of each lead portion that forms said gimbal ring portion.

2. The head suspension of claim 1, wherein said anchor plate connects said lead portions together at a point where said first axis of motion for said slider bond pad crosses said gimbal ring portion.

3. The head suspension of claim 2, wherein said lead portions provide a bridge between said load beam and said gimbal ring portion extending along said first axis of motion of said slider bond pad.

4. The head suspension of claim 3, wherein said lead portions provide plural bridges between said load beam and said gimbal ring portion extending along said first axis of motion of said slider bond pad, and plural anchor plates provide connection between lead portions at plural points where the first axis of motion of said slider bond pad crosses said gimbal ring portion.

5. The head suspension of claim 1, wherein said lead portions form a gimbal ring that extends substantially completely about said slider bond pad.

6. The head suspension of claim 5, wherein said lead portions provide plural bridges between said load beam and said gimbal ring extending along said first axis of motion of said slider bond pad, and plural anchor plates provide connection between lead portions at plural points where the first axis of motion of said slider bond pad crosses said gimbal ring.

7. The head suspension of claim 6, wherein said lead portions additionally define a second axis of motion for said slider bond pad.

8. The head suspension of claim 7, wherein said lead portions provide a bridge between said gimbal ring and said slider bond pad extending along said second axis of motion of said slider bond pad, and an anchor plate connects said lead portions together at a point where said second axis of motion for said slider bond pad crosses said gimbal ring.

9. The head suspension of claim 8, wherein said lead portions provide plural bridges between said load beam and said gimbal ring extending along said second axis of motion of said slider bond pad, and plural anchor plates provide connection between lead portions at plural points where the second axis of motion of said slider bond pad crosses said gimbal ring.

10. The head suspension of claim 1, further including insulating material between said lead portions and said slider bond where said lead portions are connected to said slider bond pad.

11. The head suspension of claim 10, further including insulating material between said lead portions and said anchor plates.

12. The head suspension of claim 11, further including insulating material between said conductive integrated leads and said load beam, and wherein conductive material of said lead portions provided on said load beam in the flexure region and lead portions connected with said slider bond pad and said anchor plate are substantially in the same plane.

13. The head suspension of claim 12, further in combination with a head slider connected to said slider bond pad.

14. The head suspension and head slider combination of claim 13, wherein said lead portions form a gimbal ring that extends substantially completely about said slider bond pad, and said lead portions provide plural bridges between said load beam and said gimbal ring extending along said first axis of motion of said slider bond pad, and plural anchor plates provide connection between lead portions at plural points where the first axis of motion of said slider bond pad crosses said gimbal ring.

15. The head suspension and head slider combination of claim 14, wherein said head slider includes at least a portion that extends under a portion of said gimbal ring that spans between anchor plates.

16. The head suspension and head slider of claim 15, wherein said lead portions additionally define a second axis of motion for said slider bond pad.

17. The head suspension and head slider of claim 16, wherein said lead portions provide a bridge between said gimbal ring and said slider bond pad extending along said second axis of motion of said slider bond pad, and an anchor plate connects said lead portions together at a point where said second axis of motion for said slider bond pad crosses said gimbal ring.

18. The head suspension and head slider of claim 17, wherein said lead portions provide plural bridges between said load beam and said gimbal ring extending along said second axis of motion of said slider bond pad, and plural anchor plates provide connection between lead portions at plural points where the second axis of motion of said slider bond pad crosses said gimbal ring.

19. The head suspension and head slider of claim 18, wherein said head slider includes plural portions thereof that extend under different portions of said gimbal ring that span between anchor plates.

20. The head suspension and head slider of claim 19, wherein said head slider has a generally rectilinear surface connected with said slider bond pad, and the four corners thereof extend under different portions of said gimbal ring that span between anchor plates.

* * * * *